United States Patent [19]
Corretti

[11] 3,792,890
[45] Feb. 19, 1974

[54] PNEUMATIC BUMPER GUARD ATTACHMENT

[76] Inventor: Leo A. R. Corretti, 2121 Warner Rd., Forth Worth, Tex. 76110

[22] Filed: Feb. 2, 1972

[21] Appl. No.: 222,850

[52] U.S. Cl..................... 293/65, 293/67, 293/71 P
[51] Int. Cl....... B60r 19/10, B61f 19/04, F16f 9/04
[58] Field of Search........... 293/64, 65, 66, 67, 71 P

[56] References Cited
UNITED STATES PATENTS
| | | | |
|---|---|---|---|
| 1,627,472 | 5/1927 | Watson | 293/71 P |
| 2,243,462 | 5/1941 | Fageol | 293/67 |
| 2,259,440 | 10/1941 | Fageol | 293/67 |
| 2,731,289 | 1/1956 | Corydon | 293/67 |

Primary Examiner—Gerald M. Forlenza
Assistant Examiner—Howard Beltran
Attorney, Agent, or Firm—Arthur F. Zobal; Wofford, Felsman & Fails

[57] ABSTRACT

The specification discloses a pneumatic bumper guard comprising a frame and holding means adapted to be releasably coupled to a conventional bumper of a motor vehicle for holding an inflatable guard in front of the normal impact receiving surface of the bumper for absorbing the force imparted upon the occurrence of a collision between the motor vehicle and another object. Both the frame and inflatable guard may be readily replaced if damaged in the event of a collision.

2 Claims, 4 Drawing Figures

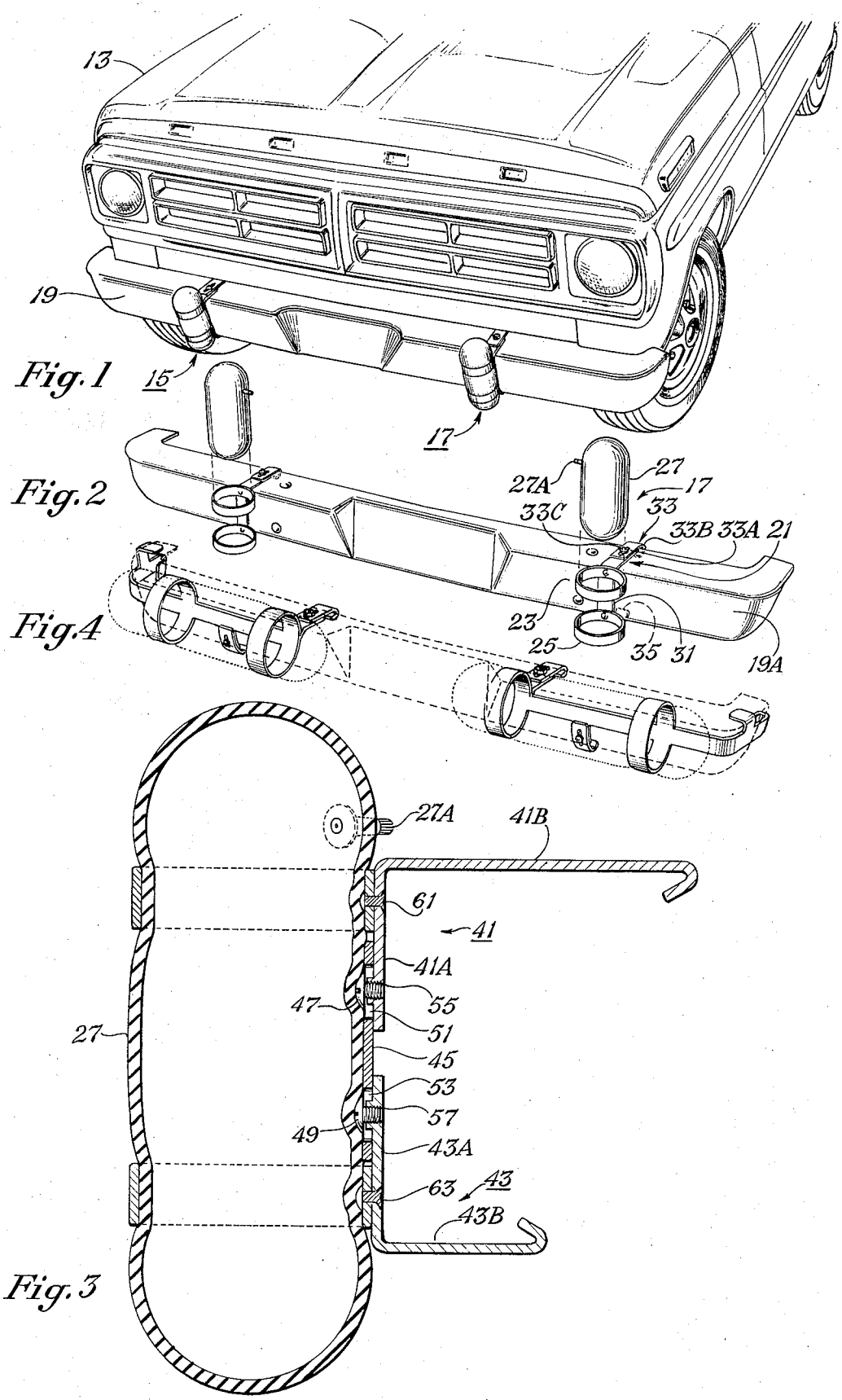

PNEUMATIC BUMPER GUARD ATTACHMENT

BACKGROUND OF THE INVENTION

This invention relates to a pneumatic bumper guard for a motor vehicle which is simple, economical, and readily replaceable.

In view of the present day practices of constructing automobiles and their ornamental bumpers, a need exists for a simple, economical, and effective guard to protect the bumper as well as the automobile and its occupants in the event of a collision.

SUMMARY OF THE INVENTION

In accordance with the present invention there is provided a pneumatic bumper guard which meets the above needs and which may be readily replaced in the event of damage. The guard comprises frame means adapted to be releasably coupled to a bumper of a motor vehicle. Holding means is coupled to the frame means and extend outwardly for holding an inflatable guard member in front of the normal impact receiving surface of the bumper. In addition there is provided a resilient guard member adapted to be inflated with gas under pressure and to be inserted and held between the outward extending portion of the holding means and the normal impact receiving surface of the bumper to absorb force imparted upon the occurrence of a collision between the motor vehicle and another object.

In the embodiment disclosed the holding means is formed of resilient material. In addition the frame means has extending arms which are adapted to extend to and to clamp to the back side of the bumper. The frame means also includes a portion to be located in front of the normal impact receiving surface of the bumper when coupled thereto and behind the resilient guard member when inserted within the holding means. The resilient guard member is separate from the frame means and from the holding means and may be readily replaced in the event that it is damaged in a collision.

BRIEF DESCRIPTION OF THE DRAWINGS

FIG. 1 illustrates one embodiment of the pneumatic bumper guards of the present invention attached to the bumper of a motor vehicle;

FIG. 2 illustrates the manner in which the pneumatic guards may be inserted within holders coupled to a frame releasably attached to a bumper;

FIG. 3 is an enlarged cross-sectional side view of the bumper guard of the type illustrated in FIGS. 1 and 2; and FIG. 4 is another embodiment of the pneumatic bumper guards of the present invention.

DETAIL DESCRIPTION OF THE PREFERRED EMBODIMENT

Referring to FIG. 1, there is illustrated a motor vehicle 13 having two pneumatic bumper guards 15 and 17 coupled to the front bumper 19. Since both pneumatic bumper guards are the same, only one bumper guard will be described. Referring to FIGS. 2 and 3, it comprises a frame 21 adapted to be releasably coupled to the bumper of an automobile, truck, or other type of motor vehicle. Coupled to the frame are two holding rings 23 and 25 which extend outward for holding an inflatable guard member, illustrated at 27, in front of the normal impact receiving surface 19A of the bumper. In the embodiment of FIGS. 1–3 each guard member 27 is held in the verticle position in front of the bumper. The side walls of the guard member 27 may be formed of resilient material such as rubber or rubber-like material, for example the resilient plastics such as nylon or vinyl. Although not shown, reinforcing cords or thread may be embedded within the side wall structure of the guard members 27 to provide additional strength. While uninflated the guard member 27 may be inserted within the two holding rings 23 and 25 and then inflated with air to a suitable pressure by way of the valve 27A after inserted. When inflated, the pneumatic guard member 27 will fit tightly within the holding rings 23 and 25, as illustrated in FIG. 3. Thus these rings will securely hold the guard member in place when inflated. The valve 27A also serves to prevent the guard member from slipping downward through the holding rings 23 and 25.

Preferably the holding means 23 and 25 are formed of resilient material for example resilient steel spring. Thus upon impact with another object, the inflated guard member 27 will give as well as the holding rings 23 and 25 to absorb the shock resulting from a collision. In the event that a guard member 27 is damaged or explodes upon impact it may be readily replaced by merely inserting another guard member within the holding rings and inflating the guard member while in place.

In addition the frame means including the holding rings may be readily replaced in the event that they are damaged. In this respect the frame 21 as illustrated in FIG. 2 comprises a front plate 31 adapted to fit in front of the impact receiving surface 19A of the bumper 19 and which will be located behind the guard member 27 when inserted within its holding rings. Extending from the plate 31 are two arms 33 and 35 adapted to clamp on the back side of the bumper 19. The arm 33 includes an adjustable extension member 33A having a hooked end 33B adapted to fit around the back edge of the bumper. The adjustable member 33 may be moved inward or outward to adjust for the size of the bumper and may be locked in place for example by a wing nut illustrated at 33C. Although not shown, arm 35 includes a similar adjustable extension member.

Referring to FIG. 3, the frame member illustrated is slightly different in that it comprises two L-shaped members 41 and 43 coupled together by an extension plate 45 and bolts 47 and 49. These bolts extend through elongated slots 51 and 53 formed through member 45 and are threaded into threaded apertures 55 and 57 formed in the frame members 41 and 43. The front portions 41A and 43A of the members 41 and 43 are adapted to be located in front of the bumper while extending arms 41B and 43B are adapted to extend and clamp to the back side of the bumper. In this embodiment, the frame may be adjusted to fit bumpers having different vertical heights by moving the members 41 and 43 together or apart to the desired position and tightening bolts 47 and 49 to secure and fix the two members 41 and 43 to the extension member 45 while in the desired position.

Although not illustrated, it is to be understood that adjustable extension members may be employed or incorporated in the extending arms 41B and 43B as described with respect to the frames of FIG. 2.

In the embodiment of FIG. 3, the holding rings 23 and 25 are riveted to the front plate members 41 and 43 by way of rivets illustrated at 61 and 63. These rings may be formed of strong resilient plastic instead of steel spring. The frame member also may be formed of metal or suitable plastic. In order to protect the pneumatic bumper guard from sharp edges, it is to be understood that the rings 23 and 25 as well as the frame member may be embedded in or wrapped with a protective covering such as rubber or resilient plastic material.

Although not shown, it is to be understood that the bumper guards also may be attached to the rear bumper or the motor vehicle.

Referring to FIG. 4, the pneumatic bumpers employed are similar except that they may be more elongated and adapted to be held in the horizontal position by the modified frame members illustrated. In this embodiment the holding rings and main frame member are formed from the same piece of material.

I claim:

1. A pneumatic bumper guard, comprising:

frame means adapted to be releasably coupled to a bumper of a motor vehicle, said frame means includes a portion to be located in front of the normal impact receiving surface of a bumper when coupled thereto, said frame member has arms which are adapted to extend to and clamp to the back side of a bumper, holding means formed of resilient material coupled to said frame means and having an outwardly extending portion, said holding means being adapted to surround an inflatable guard member for holding the inflatable guard member between the outwardly extending portion of said holding means and said portion of said frame means to be located in front of the normal impact receiving surface of a bumper when coupled thereto, and a resilient guard member adapted to be inflated with gas under pressure and to be inserted and held between said outwardly extending portion of said holding means and said portion of said frame means to be located in front of the normal impact receiving surface of a bumper to absorb force imparted upon the occurrence of a collision between said motor vehicle and another object, said resilient guard member is separate from said frame means and said holding means and may be readily replaced in the event that it is damaged in a collision, said resilient guard member is adapted to be held only by said holding means and frame.

2. The bumper guard of claim 1 comprising:

a second holding means formed of resilient material coupled to said frame means and having an outwardly extending portion, said second holding means being spaced from said other holding means, said second holding means being adapted to surround the inflatable guard member for holding the inflatable guard member between the outwardly extending portion of said second holding means and said portion of said frame means to be located in front of the normal impact receiving surface of a bumper when coupled thereto, said resilient guard member being adapted to be inflated with gas under pressure and to be inserted and held between said outwardly extending portions of said two holding means and said portion of said frame means to be located in front of the normal impact receiving surface of a bumper to absorb force imparted upon the occurrence of a collision between said motor vehicle and another object.

* * * * *